US012626170B2

(12) United States Patent
Shtoff

(10) Patent No.: US 12,626,170 B2
(45) Date of Patent: May 12, 2026

(54) SYSTEM AND METHOD FOR APPROXIMATING NUMERICAL FEATURES VIA CUBIC SPLINES AND APPLICATIONS THEREOF

(71) Applicant: YAHOO AD TECH LLC, Dulles, VA (US)

(72) Inventor: Alex Shtoff, Haifa (IL)

(73) Assignee: YAHOO AD TECH LLC, Dulles (VA)

( * ) Notice: Subject to any disclaimer, the term of this patent is extended or adjusted under 35 U.S.C. 154(b) by 1109 days.

(21) Appl. No.: 17/412,970

(22) Filed: Aug. 26, 2021

(65) Prior Publication Data

US 2023/0065409 A1    Mar. 2, 2023

(51) Int. Cl.
 *G06N 7/08* (2006.01)
 *G06F 17/14* (2006.01)
 *G06N 20/00* (2019.01)
(52) U.S. Cl.
 CPC .............. *G06N 7/08* (2013.01); *G06F 17/14* (2013.01); *G06N 20/00* (2019.01)
(58) Field of Classification Search
 CPC ........... G06N 7/08; G06N 20/00; G06F 17/14
 See application file for complete search history.

(56) References Cited

U.S. PATENT DOCUMENTS

2020/0128721 A1 *  4/2020  Lewis .................... G01N 33/24

OTHER PUBLICATIONS

Kim, Tae-wan, and Boris Kvasov. "A shape-preserving approximation by weighted cubic splines." Journal of Computational and Applied Mathematics 236.17 (2012): 4383-4397. (Year: 2012).*
Xiao, Jun, et al. "Attentional factorization machines: Learning the weight of feature interactions via attention networks." arXiv preprint arXiv:1708.04617 (2017). (Year: 2017).*
Choi, Jin-A., and Kiho Lim. "Identifying machine learning techniques for classification of target advertising." ICT Express 6.3 (2020): 175-180. (Year: 2020).*
Wikipedia, "B-spline", Apr. 10, 2021, "https://en.wikipedia.org/w/index.php?title=B-spline&oldid=1017102480".
Shtoff, "Numerical feature continuity", Design Document, May 24, 2021.

* cited by examiner

*Primary Examiner* — Kevin W Figueroa
(74) *Attorney, Agent, or Firm* — Venable LLP

(57) ABSTRACT

The present teaching relates to method, system, medium, and implementations for approximating a non-linear relationship between a numerical feature and an output of a model. A value of a numerical feature is received and is transformed, via a transform function, into a transformed value within a fixed range. With respect to each of a plurality of basis functions used for approximating the non-linear relationship, a respective basis function value of the basis function is computed based on the transformed value. An approximated value of the non-linear numeric feature is generated based on a sum of the plurality of basis function values weighted respectively by each corresponding one of a set of the weights, obtained via machine learning.

20 Claims, 15 Drawing Sheets

$$\Phi_{FMs}\left(\left(\boldsymbol{w}, \boldsymbol{v}\right), \boldsymbol{x}\right) = w_0 + \sum_{i=1}^{N} x_i w_i + \sum_{i=1}^{N}\sum_{j=i+1}^{N} x_i x_j \langle \boldsymbol{v}_i, \boldsymbol{v}_j \rangle$$

- Example:
  - $x_1 = \mathbb{1}\{0 \leq z < 20\}$
  - $x_2 = \mathbb{1}\{20 \leq z < 40\}$
  - $\ldots$
  - $x_5 = \mathbb{1}\{z > 200\}$ 170 (piecewise step function))

Spline basis functions 220 (1st basis function $B_1(x)$)

230 (2nd basis function $B_2(x)$)

240 (3rd basis function $B_3(x)$)

250 (4th basis function $B_4(x)$)

260 (5th basis function $B_5(x)$)

270 (6th basis function $B_6(x)$)

X x $\Phi_{FM}$ is a spline function of T(z)

SYSTEM AND METHOD FOR APPROXIMATING NUMERICAL FEATURES VIA CUBIC SPLINES AND APPLICATIONS THEREOF

BACKGROUND

1. Technical Field

The present teaching generally relates to data representation in computers. More specifically, the present teaching relates to representation of numerical features in computers.

2. Technical Background

With the development of the Internet and the ubiquitous network connections, more and more commercial and social activities are conducted online. To facilitate a more productive online environment, information about different online events is collected and analyzed in order to more effectively utilize the online environment. For example, event information may be used to determine preferences of users in order to display ads more relevant to their interests. Information about users who signed up for certain online services may be analyzed to determine the more active time frames of different demographical groups so that services or advertisements appropriate for different demographical groups may be scheduled in a more meaningful way.

One of the issues in data analytics is how to represent different types of information embedded in online events of interests. For example, a user may fall within a certain age group, may be active on some online platforms during different time frames of the day, may have clicked a certain number ads displayed on different online platforms, etc. Big data with such information may be valuable in correlating certain population with certain preferences in different time periods. Analytics of such collected information are to reveal such correlations and machine learning may be applied to learn how to optimize the performance considering the characteristics captured by such analytics.

FIG. 1A shows an exemplary framework called factorization machine that learns such correlation via collected event data. Different features involved in different events may be collected and represented as feature vectors 100. In this illustration, three types of data are involved, including website, gender, and advertiser. The specific example values for the three types of features are Yahoo.com (website), male, and Disney and they are encoded in matrix 100 as embeddings. The encoded values of the feature vectors for website, gender, and advertisers are sent to subnets 110, 120, and 130, which generate individual representation for each type of information. Interactions among types of information do often play an important role. For example, users in a certain gender group may tend to click on ads from some certain advertisers and possibly even on certain website. To learn such interactions among different types of information, the representations of these three types of information are fed to the dot product layer 140.

To learn the behavior of a user with respect to advertisements from different advertisers on different websites, both the individual representations of different types of information (such as website, gender, and advertiser) as well as the interactions among different feature types may be used to formulate a learning scheme as provided in FIG. 1A. In this formulation, what is learned include $w_i$, $0 \leq i \leq N$, as weights to different features, where $w_0$ represents a bias, $w_i$ is a weight applied to feature $x_i$, and dot product $x_i * x_j (v_i, v_j)$ represents the interaction between feature $x_i$ and feature $x_j$. To capture the patterns embedded in the collected event data, one of the keys is to be able to represent each feature, especially numerical values, accurately.

Current approaches to encoding numerical values (such as age of a user or several visits to a site or a few past views per category of products) when used in factorization machine or its variants include both direct numerical feature encoding and binning. The direct numerical feature encoding in factorization machine can represent only linear relationship. Given that, for any more complex non-linear relationship, such as the one shown in FIG. 1B, this approach captures the underlying non-linear relationship using only a linear approximation, as shown in FIG. 1C. As such, it cannot accurately characterize the relationship being modeled.

Another common approach to encode numerical features is binning, which allows learning a non-linear relationship using a step function. This is shown in FIG. 1D. With this approach, the range of valid values of a numerical feature is divided into groups, or bins, with each bin is treated or becomes a categorical feature with two values, 0 and 1. In the example illustrated in FIG. 1D, a non-linear relationship between z and the model's output is represented by a piecewise step function 170 with bins $x_1$ corresponding to ranges $\{0 \leq z < 20\}$, $x_2$ corresponding to range $\{20 \leq z < 40\}, \dots$, and $x_5$ corresponding to range $\{z > 200\}$. In this representation, with a number that needs to be encoded, the bin the number belongs to gets the value 1 while the other bins get the value 0. That is, through binning, the numerical feature is transformed into a set of categorical features with values "0" or "1." While the binning approach may be able to represent the non-linear characteristic of an underlying numerical feature, it is often coarse-grained and suffers from two main drawbacks.

One drawback is related to information loss. As values that fall into the same bin are considered as equivalent so that it does not capture the subtle differences between different values. For example, consider using binning to represent the number of times a user clicked on tourism ads. Assume that bins employed are for intervals [0, 2], [2, 10], [10, 100], [100, infinity). As such, there is no difference between a user who clicked 3 times and another user who clicked 9 times in terms of the number of historical clicks as both 3 and 9 fall into the same bin [2, 10].

Although the issue of information loss may be levitated by using finer-grained bins, it may lead to the problem of sparsity. When fine-grained bins are employed, for example a bin for each value, then the number of times that each bin has any non-zero value usually becomes very small, making it difficult to allow the model be accurately trained to capture user preferences with respect to these fine-grained bins.

Thus, there is a need for a solution that address the shortcomings and challenges of the traditional approaches.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for approximating a non-linear numeric feature value is disclosed. A value of a numerical feature is received and is transformed, via a transform function, into a transformed value within a fixed range. With respect to each of a plurality of basis functions used for approximating the value of the non-linear relationship, a respective basis function value of the basis function is computed based on the transformed value. An approximated value of the non-linear numeric feature is generated based on a sum of the plurality of basis function values weighted respectively by each corresponding one of a set of the weights, obtained via machine learning.

In a different example, a system is disclosed for approximating a non-linear numeric feature value. The system includes a training data processor, a data transformation unit, and a basis function value generator. The training data processor is configured for processing a value of a numerical feature. The data transformation unit is configured for transforming, via a transform function, the value into a transformed value within a fixed range. The basis function value generator is configured for computing, with respect to each of a plurality of basis functions for approximating the value of the non-linear relationship, a respective basis function value of the basis function based on the transformed value. A set of weights are used for generating an approximated value of the non-linear numeric feature via a sum of the plurality of basis function values weighted respectively by each corresponding one of the set of the weights, where each of the set of weights is associated with one of plurality of basis functions and is obtained via machine learning.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for approximating a non-linear numeric feature value. The information, when read by the machine, causes the machine to perform the following steps. A value of a numerical feature is received and is transformed, via a transform function, into a transformed value within a fixed range. With respect to each of a plurality of basis functions used for approximating the value of the non-linear relationship, a respective basis function value of the basis function is computed based on the transformed value. An approximated value of the non-linear numeric feature is generated based on a sum of the plurality of basis function values weighted respectively by each corresponding one of a set of the weights, obtained via machine learning.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

Figure 1A:
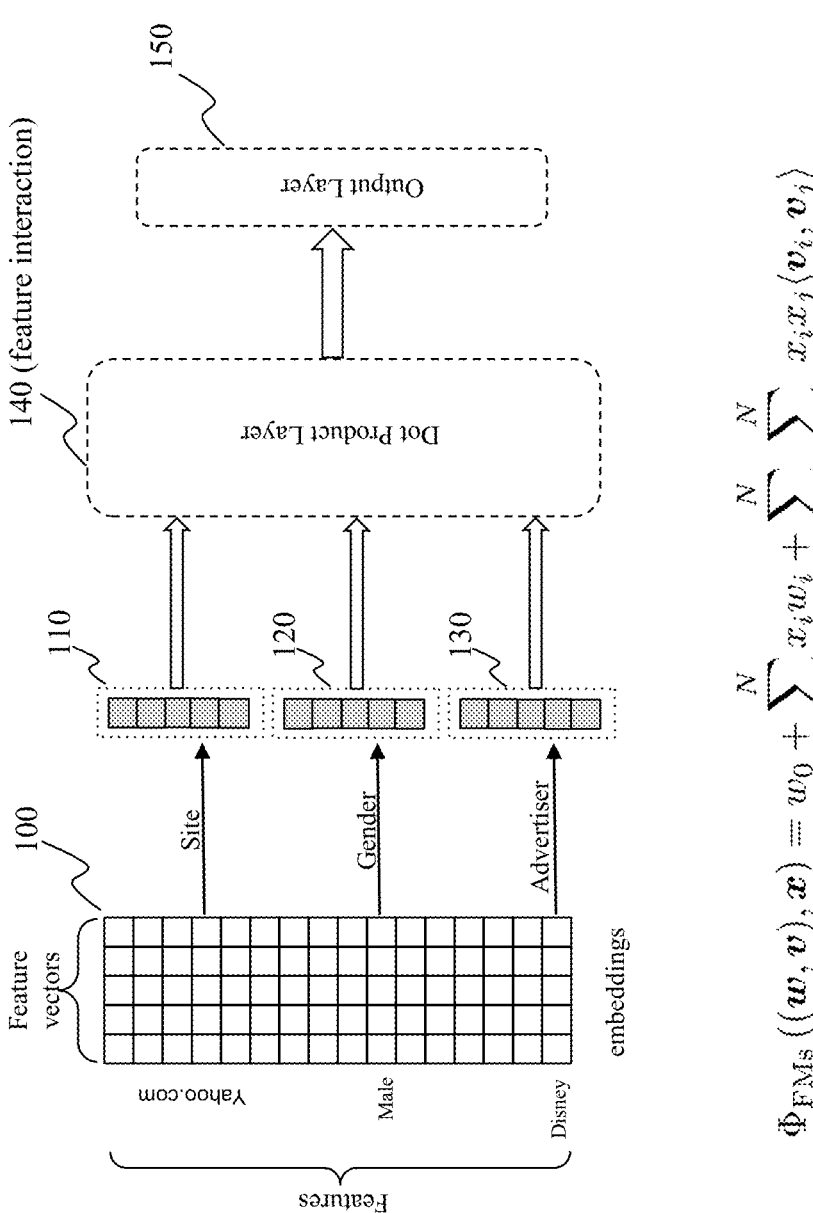
FIGS. 1A-1D (PRIOR ART) provide examples of prior art approaches to approximate numerical feature values.
Figure 1B:
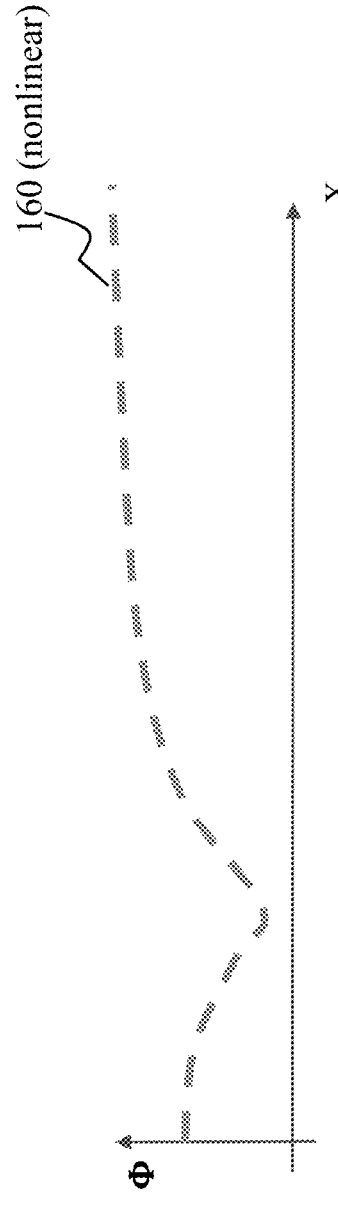
Figure 1C:
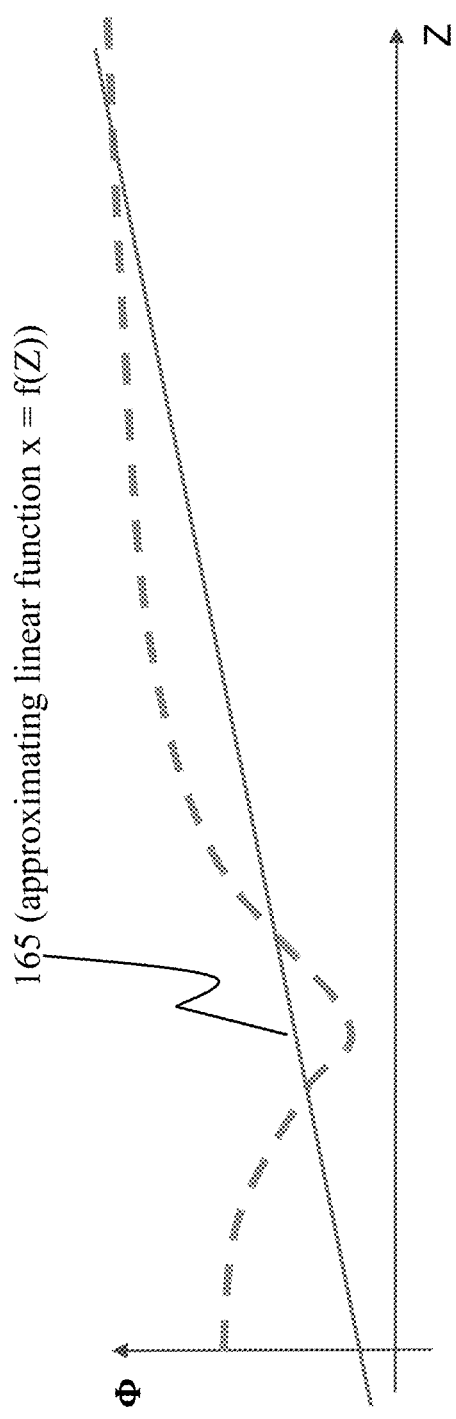
Figure 1D:
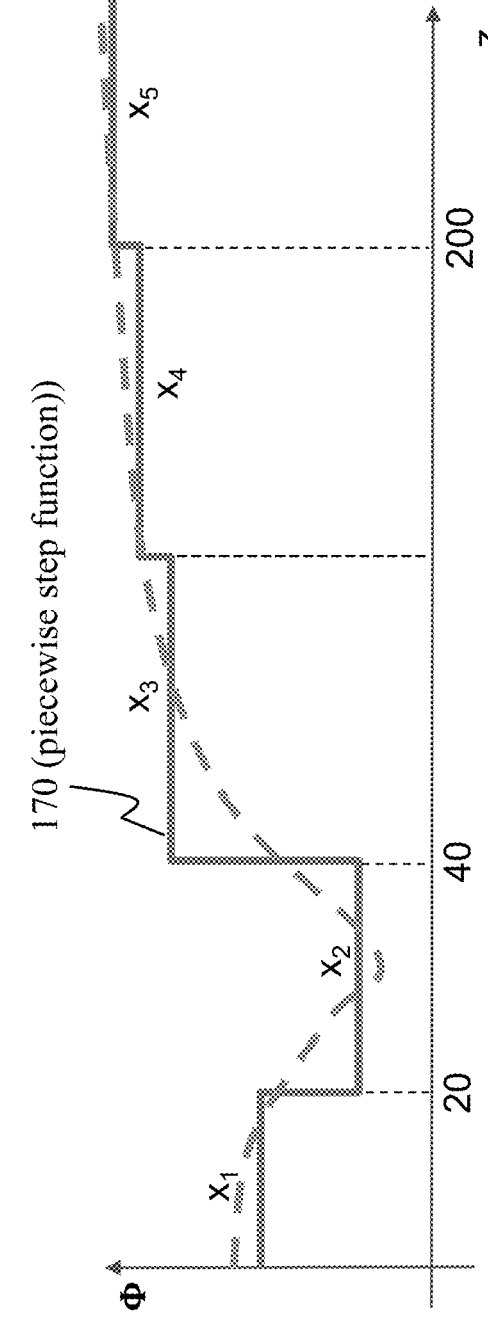
Figure 2A:
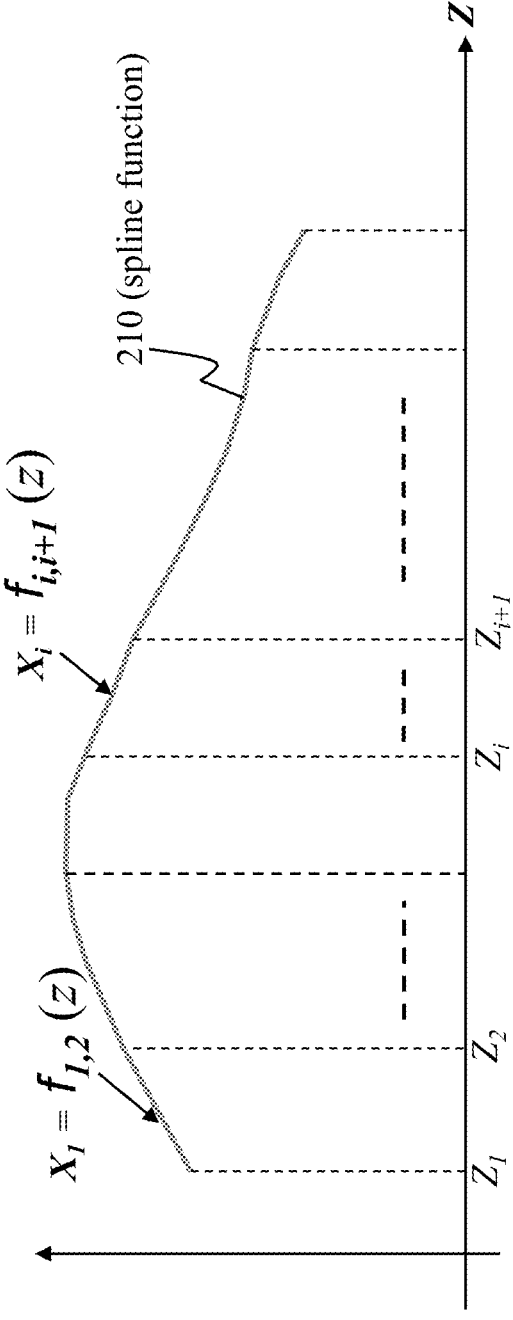
FIG. 2A depicts an exemplary spline function with respect to a knot sequence.

The present teaching aims to address the deficiencies of the current state of art in representing or approximating a non-linear relationship via a set of numerical features as basis functions to enhance the accuracy of the approximation, to minimize loss of information, and to enable more efficiency machine learning with minimized sparsity issue. The present teaching uses a set of spline (non-linear) functions to approximate a non-linear relationship. FIG. 2A depicts an exemplary spline function 210 with respect to a knot sequence formed by points $Z_1, Z_2, \ldots, Z_i, Z_{i+1}, \ldots$ with corresponding local functions $X_1=f_{1,2}(z)$ between knots $Z_1$ and $Z_2$, $X_2=f_{2,3}(z)$ between $Z_2$ and $Z$, . . . , $X_i=f_{i,i+1}(z)$ between $Z_i$ and $Z_{i+1}$, etc. A spline function is non-linear and is generally able to approximate any function well with a few basis functions.

Figure 2B:
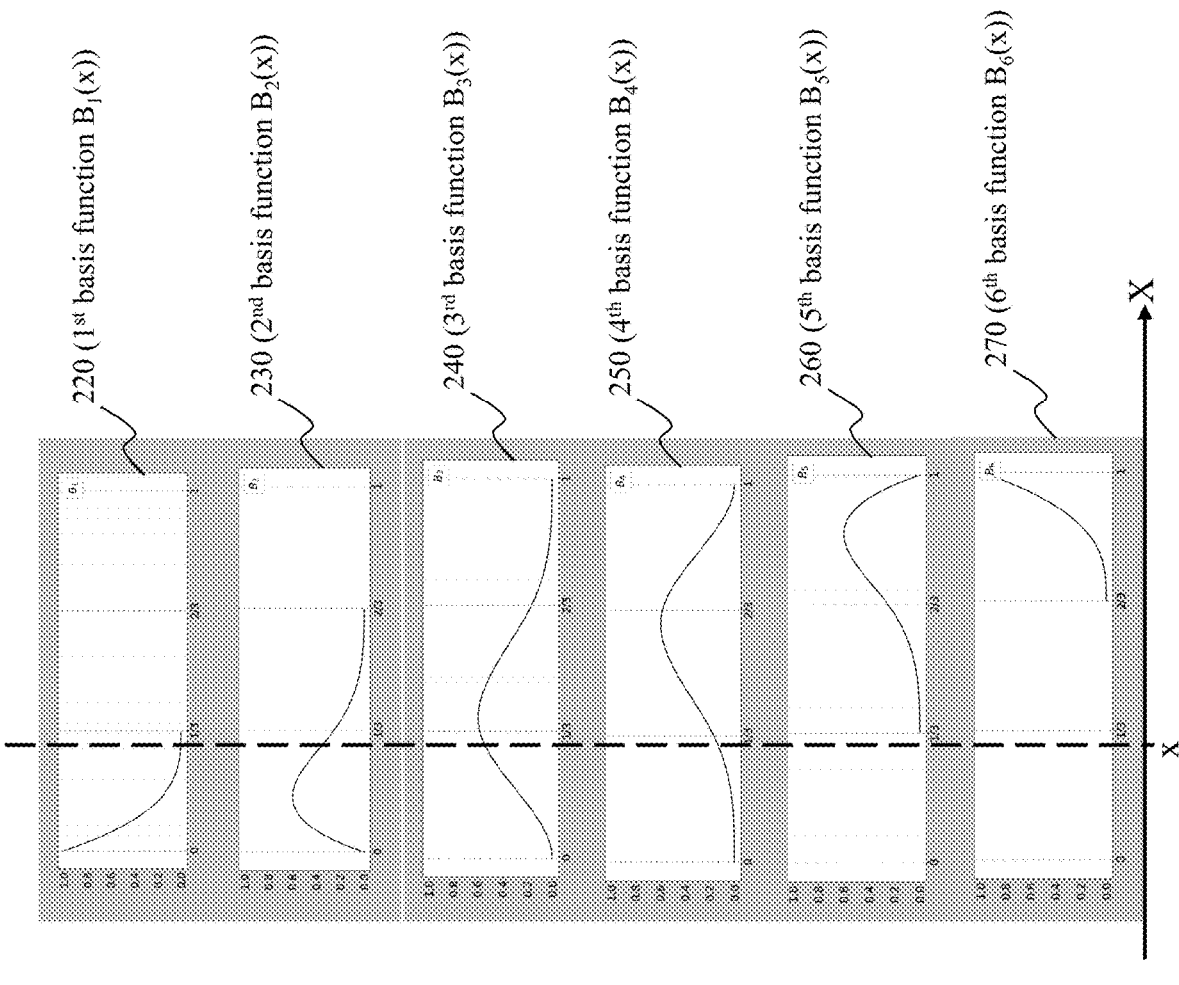
FIG. 2B illustrates a number of exemplary spline basis functions.
Figure 3A:
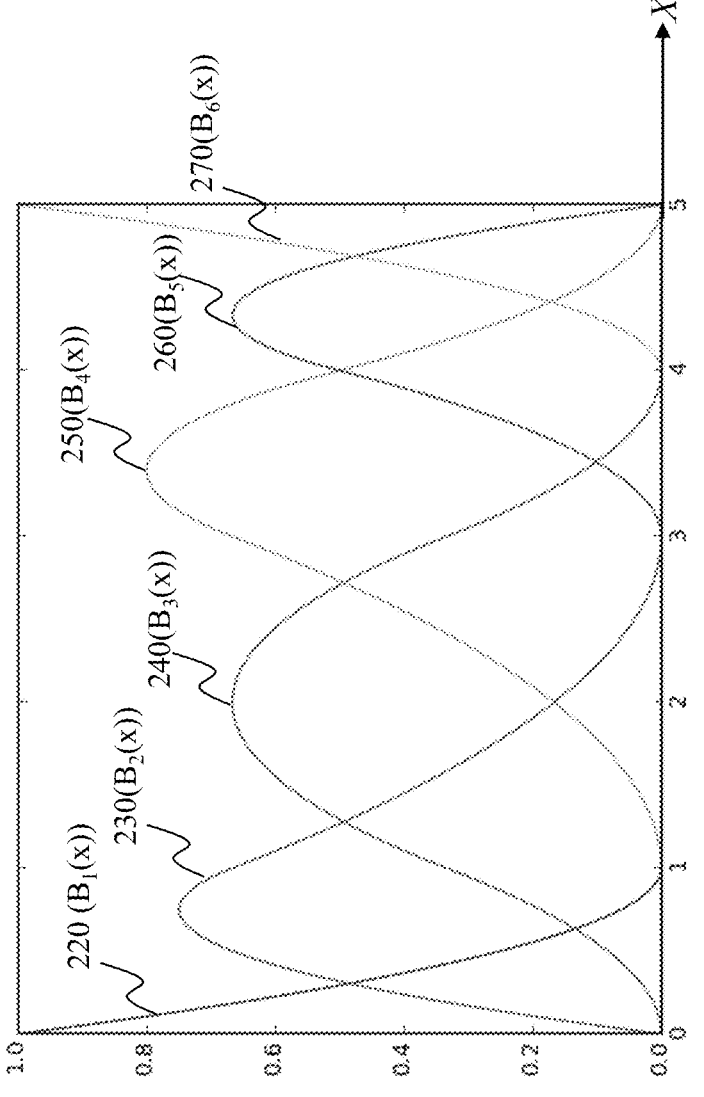
FIG. 3A depicts an exemplary representation of a numerical feature using a set of numerical features within a specified range, in accordance with an exemplary embodiment of the present teaching.

FIG. 2B shows a number of exemplary spline basis functions, within a numerical range [0, 1], including the first basis function $B_1(x)$ 220, the second basis function $B_2(x)$ 230, the third basis function $B_3(x)$ 240, the fourth basis function $B_4(x)$ 250, the fifth basis function $\alpha B_5(x)$ 260, and the sixth basis function $B_6(x)$ 270. Using these 6 basis spline functions, the values of a non-linear relationship at a point x, $0<=x<=1$, may be approximated based on a combination of the basis function values, i.e., $B_1(x)$ 220, $B_2(x)$ 230, $B_3(x)$ 240, $B_4(x)$ 250, and $B_5(x)$ 260. This is further illustrated in FIG. 3A, which depicts an exemplary representation of a numerical feature using a set of numerical features within a specified range, in accordance with an exemplary embodiment of the present teaching. With this approximation scheme, the values of a non-linear relationship, say F(x), may be determined based on the values of a set of basis functions such as the basis functions as shown in FIG. 2B. That is, the value of non-linear relationship F(x) may be determined as:

$$F(x) = \alpha_1 B_1(x) + \alpha_2 B_2(x) +$$
$$\alpha_3 B_3(x) + \alpha_4 B_4(x) + \alpha_5 B_5(x) + \alpha_6 B_6(x) = \sum_{i=0}^{n} \alpha_1 B_i(x)$$

where the illustrated range of X is [0, 5]. In some situations, some numerical features may have an uneven distribution (values do not spread uniformly). In some situations, such features may or may not be bounded. For instance, a numerical feature on a historical click rate on ads of a particular category may be bounded with a value between 0 and 1 (e.g., representing a probability). However, a numerical feature of a number of clicks on ads is an unbounded because there is no upper limit on its value. This may make it more difficult to select a set of numerical features for the approximation. On the other hand, there are known basis functions that can well approximate non-linear features in a certain specified range. In some embodiments, it is preferable to limit the range of the values of a nonlinear numerical feature within a fixed small range such as [0, 1] or [−1, 1]. In some embodiments, values of a non-linear relationship to be approximated may be encoded so that the initial values of the numerical feature are transformed to fall into a fixed range, within which the approximation may be performed.

Figure 3B:
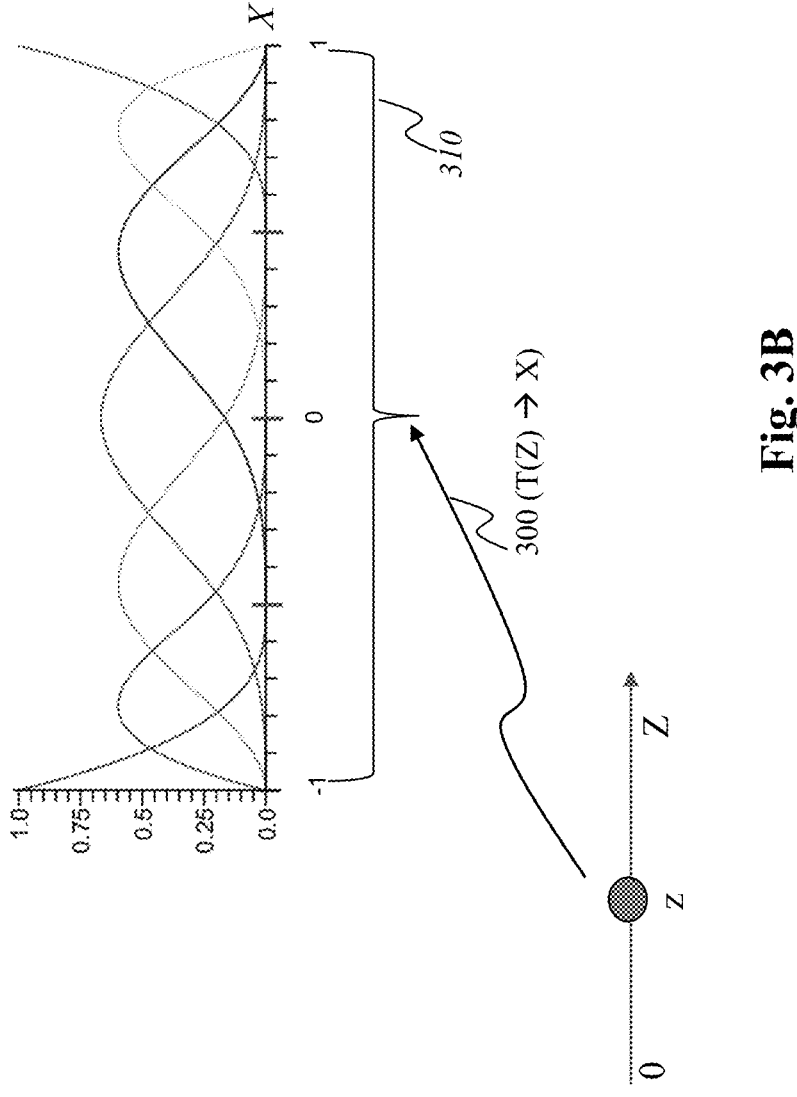
FIG. 3B depicts an exemplary transformation mapping values of a numerical feature to a specified range, in accordance with an exemplary embodiment of the present teaching.
Figure 3C:
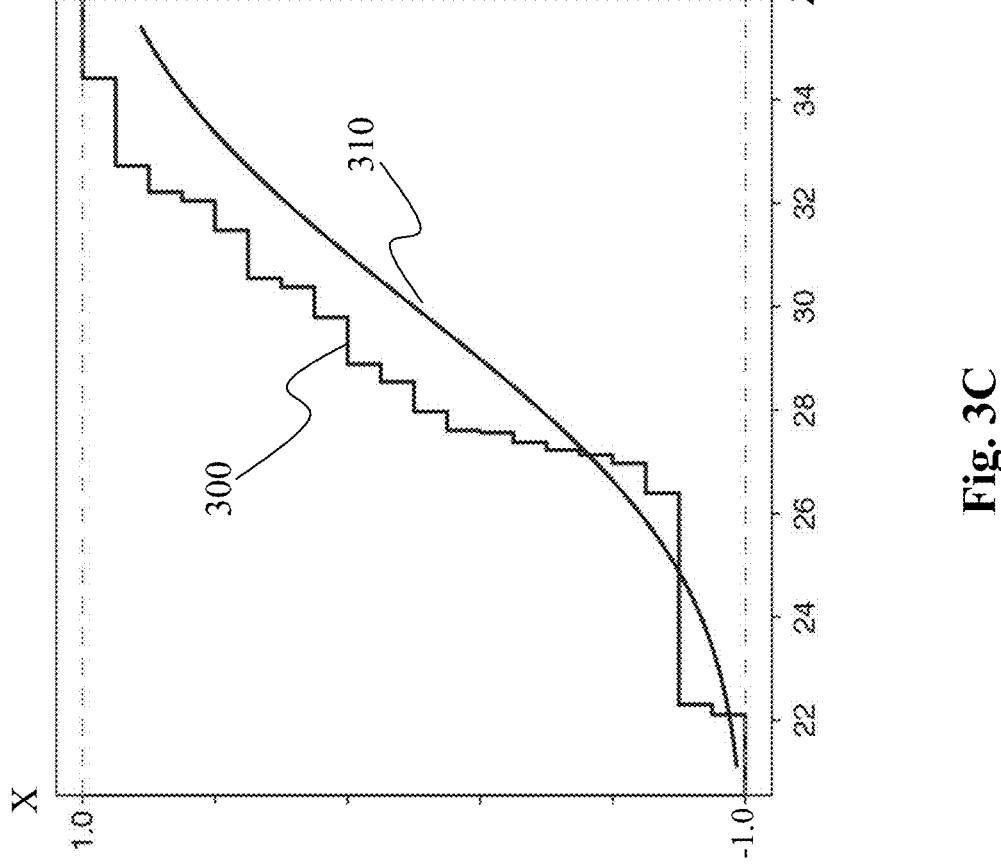
FIG. 3C shows an exemplary empirical cumulative distribution of a numerical feature and a transform function, in accordance with an exemplary embodiment of the present teaching.

FIG. 3B depicts an exemplary transformation scheme encoding values of a numerical feature within a specified range via a transformation function, in accordance with an exemplary embodiment of the present teaching. In this illustration, a numerical feature z may have an initial value range of [0, Z]. A fixed approximation range, such as [−1, 1], may be specified within which encoding of the numerical feature is to be computed. As shown, the initial values z of the numerical feature to be approximated may be transformed or mapped, using a transformation function T, to a transformed value x in a fixed range of T(Z), as seen in FIG. 3B. In some embodiments, the transformation function is determined via data research and modeling. For instance, to encode a numerical feature such as a user's age, an empirical cumulative distribution for feature "age" may be built based on a data set. FIG. 3C illustrates this example, where 300 represents the empirical cumulative distribution of numerical feature "age." A transform function T(Z) 310 may be identified that resembles the empirical cumulative distribution 300 with its output values within a specified fixed range, e.g., [−1, 1], so that T may be used to encode the feature values of "age" to generate transformed values within the fixed range, say [−1, 1]. That is, $T(Z){\rightarrow}X$ as shown in FIGS. 3B-3C.

Figure 4:
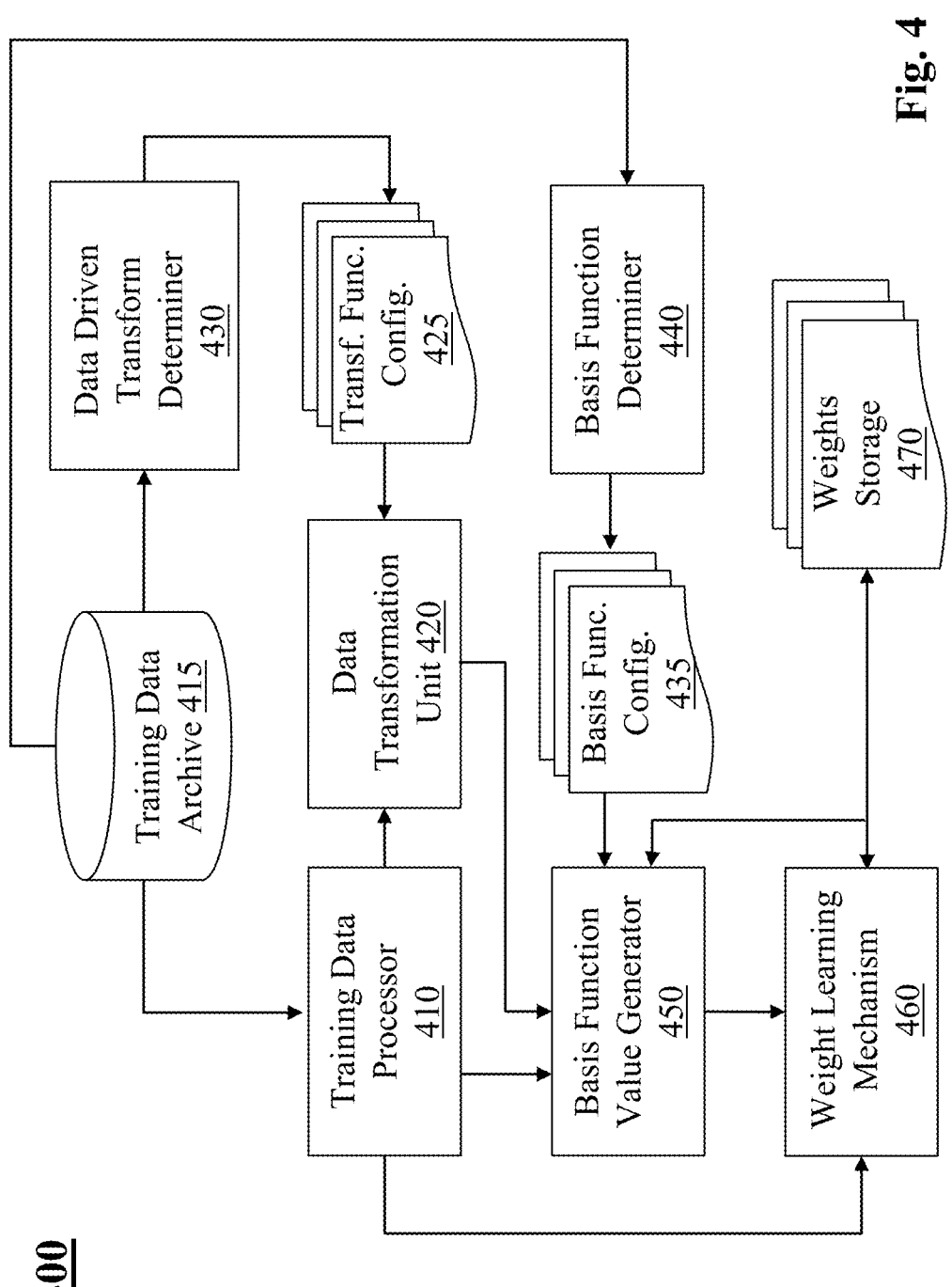
FIG. 4 depicts an exemplary high-level system diagram for obtaining weights of a set of basis functions in approximating values of a non-linear relationship based on training data, in accordance with an exemplary embodiment of the present teaching.

FIG. 4 depicts an exemplary high-level system diagram of a mechanism 400 for obtaining via learning weights of a set of basis functions for approximating values of a non-linear relationship, in accordance with an exemplary embodiment of the present teaching. In this illustrated embodiment, mechanism 400 comprises a training data processor 410, a data transformer 420, a data driven transform determiner 430, a base function determiner 440, a basis function value generator 450, and a weight learning mechanism 460. As discussed herein, the present teaching aims at using a set of basis functions $B_i(X)$, $1<=i<=K$, to more accurately approximate the values of a non-linear relationship (e.g., the relationship between the number of clicks or age and the likelihood of clicking an ad). To achieve that, a set of basis functions needs to be determined and that is performed by the basis function determiner 440. The determination includes a number of basis functions (e.g., 5 or 6) and the form of the basis functions (e.g., spline basis functions). Information specifying such determined basis functions (including, e.g., the functions used and a number of the basis functions) is stored in the basis function configuration 435 and is used by the basis function value generator 450.

Also as discussed herein, when the basis functions selected operate in a numerical range (e.g., [−1, 1] or [0, 1]) that differs from the value range of the numerical feature to be approximated, a transformation function T is needed to encode the values to be approximated to fall within the numerical range of the basis functions. As illustrated in FIG. 3C, such a transformation function T is determined based on an empirical cumulative distribution of the data observed and it is identified by the data driven transform determiner 430 via data research and modeling. Information about the identified transformation function T is stored in a transformation function configuration storage 425 and used by the data transformer 420 to encode the values of the numerical feature being encoded so that the mapped values fall within the fixed range of the basis functions.

To facilitate the learning, a training data archive 415 stores training data collected from online events. For example, an event may be that a male user clicked an advertisement from advertiser Disney on website Yahoo-.com. Such training data may be processed to further create relevant statistics to facilitate a better understanding of correlations among different features. For example, performance statistics on effectiveness of advertisements on various websites among different users across, e.g., different demographical groups may enable an understanding on, e.g., what advertisements are better received on which website among which group(s) of users. Such statistics may include, e.g., a total number of clicks from users of a certain characteristic (e.g., male users) on advertisements from each advertiser displayed on each website. Such statistics may facilitate an optimized determination in terms of which advertisement to be displayed on a given website to a user having some known characteristics.

Figure 6A:
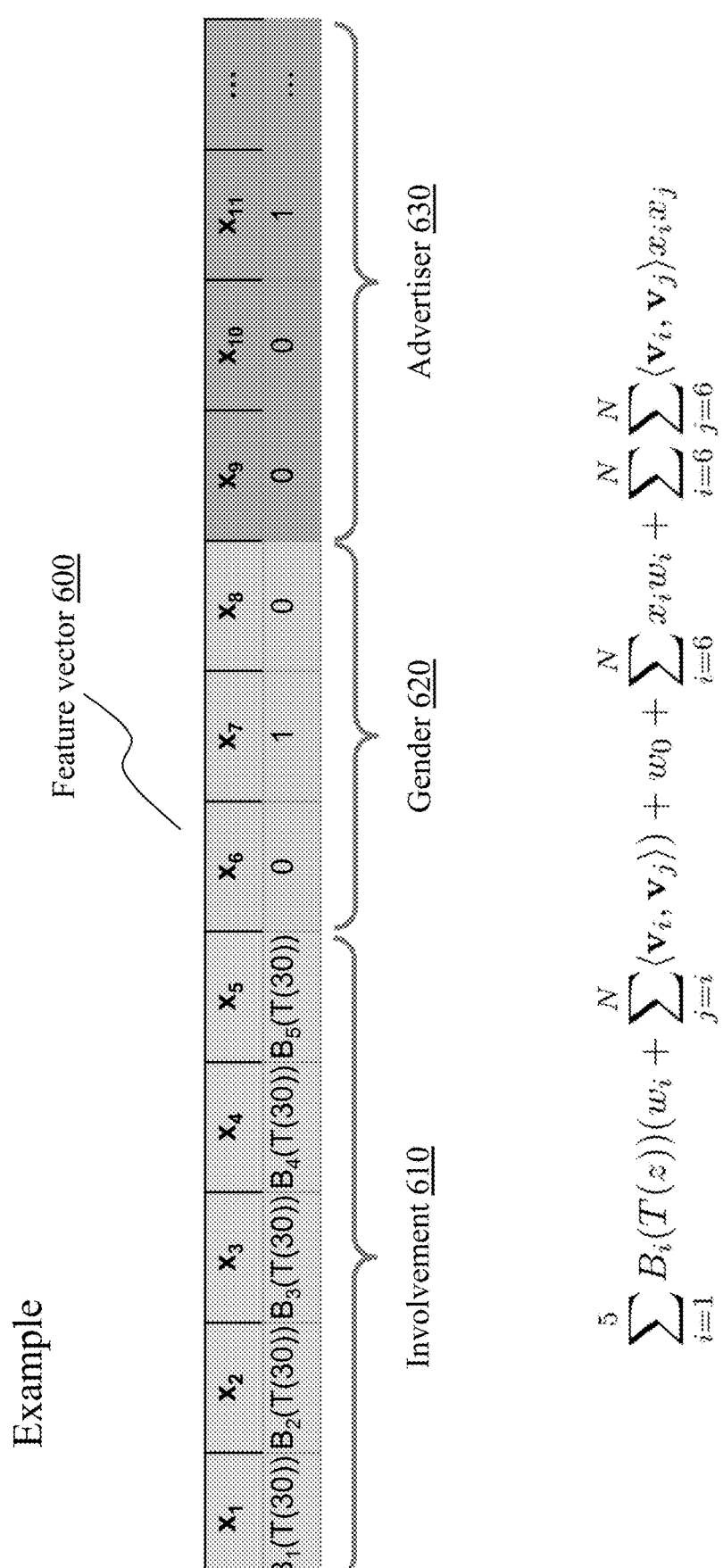
FIG. 6A provides an exemplary application of approximating a non-linear numerical feature using a set of numerical features in factorization machine, in accordance with an exemplary embodiment of the present teaching.

In such applications, certain statistics (e.g., a total number of clicks on advertisements on a website by users of certain characteristics) may correspond to a numerical feature. The present teaching may be applied to approximate such statistics more accurately to avoid the shortcomings of the current state of the art (e.g., loss of information and sparsity). FIG. 6A shows an example feature vector 600 with such a statistic or a numerical feature, e.g., called involvement represented as, e.g., a total number of clicks by users in a gender group on advertisements from a particular advertiser. In this example, the feature vector 600 may be encoded by $X_1$, $X_2$, $X_3$, $X_4$, $X_5$, $X_6$, $X_7$, $X_8$, $X_9$, $X_{10}$, $X_{11}$, . . . , where $X_1$, $X_2$, $X_3$, $X_4$, $X_5$ represent involvement feature 610 as a total number of clicks; $X_5$, $X_6$, $X_7$ represent a gender feature 620 (e.g., encoded as male when $X_6$=1, female when $X_7$=1, and unknown when $X_8$=1); and $X_9$, $X_{10}$, $X_{11}$, . . . $X_N$ represent advertisers with each bit encoding a specific advertiser (e.g., $X_{11}$=1 indicates that it is advertiser 3). In this exemplary feature vector 600, the value of the numerical feature on involvement represents a value of a numerical feature representing the number of clicks on an advertisement from advertiser represented by $X_{11}$ by all users of a gender represented by $X_7$.

As seen, to accurately approximate the value of involvement, $X_1$, $X_2$, $X_3$, $X_4$, $X_5$ are used to encode the number of clicks. For instance, the value of involvement in this example is 30. To approximate this value 30, it is first encoded using a transform function T that maps value 30 to a value within a fixed range of [−1, 1]. That is, $-1 <= T(30) <= 1$. The mapped value is then approximated using 5 basis functions, i.e., $B_1(T(30))$, $B_2(T(30))$, $B_3(T(30))$, $B_4(T(30))$, $B_5(T(30))$, as shown in FIG. 6A. Each of the basis functions will output a value and the 5 values generated by the 5 basis functions are then combined in a weighted summation as shown in FIG. 6A. That is, $$\sum_{i=1}^{5} B_i(T(z))\left(w_i + \sum_{j=i}^{N} \langle v_i, v_j \rangle\right) + w_0 + \sum_{i=6}^{N} x_i w_i + \sum_{i=6}^{N}\sum_{j=6}^{N} \langle v_i, v_j \rangle x_i x_j \quad (1)$$

where $w_0$ may represent a bias, $w_i$, $1 <= i <= 5$, may represent a weight to the $i^{th}$ basis function, while $w_i$, $6 <= i <= N$, may represent the weights with respect to the remaining attributes in the feature vector 600. In this formulation, not only each attribute in feature vector is weighed, the interactions among different features are also considered via dot products $v_i$ and $v_j$, $6 <= i$, $j <= N$.

Referring to FIG. 4, in operation, to learn weights based on training data from archive 415, the training data are retrieved by the training data processor 410. For instance, in some embodiments, the training data may include collected event data and the training data processor 410 may process such event data to generate, e.g., the involvement statistics (e.g., Z) based on events with similar advertisers and gender information is the underlying users. Once the statistics (such as involvement Z) are generated based on the training data, the data (Z) are sent to the data transformer 420, where the values Z of numerical features are encoded, based on the selected transform function specified in 425, to generated encoded values (T(Z)=X) that are within a specified range (e.g., [−1, 1]).

The encoded values T(Z)=X are then sent to the basis function value generator 450 which uses the selected basis functions (e.g., $B_i(X)$, $1 <= i <= K$) to compute the values of the basis functions with respect to the encoded value X=T (Z), e.g., $B_i(X)$, $1 <= i <= K$. Such computed basis function values are then used, by the weight learning mechanism 460 to compute the weighted sum, e.g., as formulated in (1) above using the weights (e.g., $w_i$, $0 <= i <= N$) presently stored in the weight storage 470. This may include the computation of the weighted approximated value for the non-linear relationship as shown below $$\sum_{i=1}^{5} B_i(T(z))\left(w_i + \sum_{j=i}^{N} \langle v_i, v_j \rangle\right)$$

as well as the remaining weighted features $$\sum_{i=6}^{N} x_i w_i + \sum_{i=6}^{N}\sum_{j=6}^{N} \langle v_i, v_j \rangle x_i x_j$$

The weights may be learned in an iterative manner based on the trained data toward convergence. In some embodiments, the learning of the weights may also be carried out in an on-the-fly learning mode based on data that arrive continuously. In this learning mode, the newly arrived data related to the numerical feature are encoded using the currently learned weights. The value of the numerical feature and the approximated non-linear relationship determined based on the currently learned weights are then used to determine how the weights are to be modified. In this mode of operation, the learning is ongoing so long as there are new data being received.

The learned weights may be stored in the weight storage 470 that can be used later in approximating more accurately relevant non-linear numerical relationship (such as the effect of involvement on the probability of clicking an ad) to facilitate the process of selecting an advertisement from a most desirable advertiser based on, e.g., relevant involvement information once the gender of a user is known.

Figure 5:
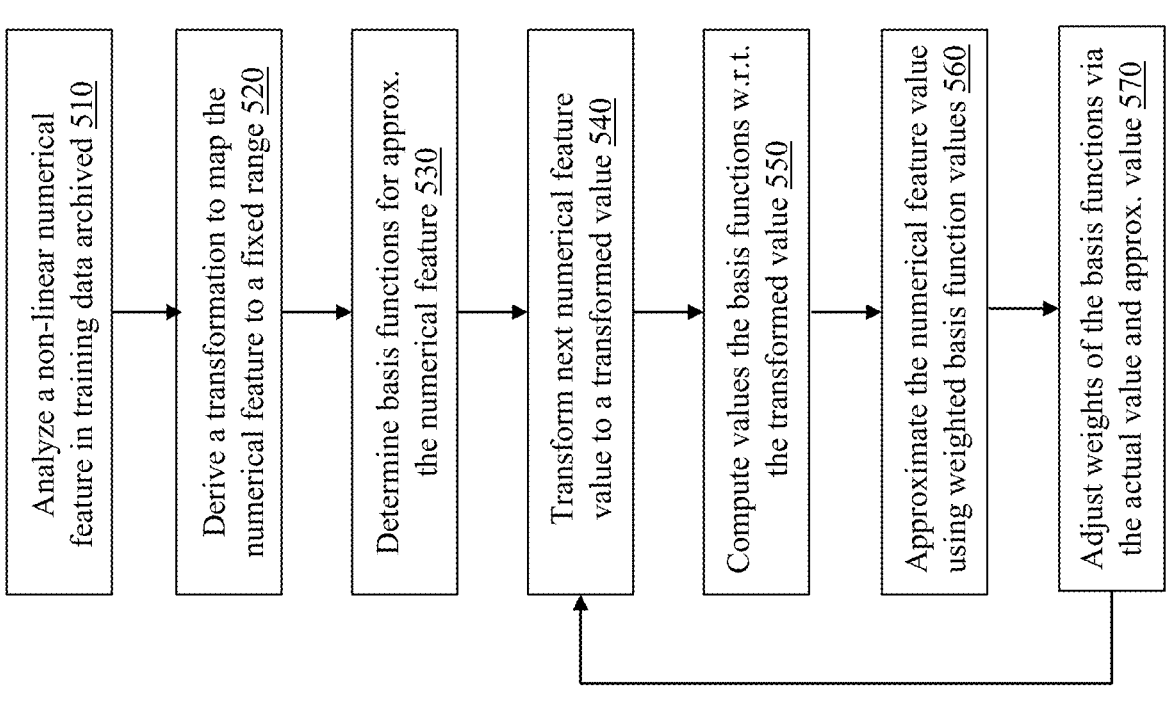
FIG. 5 is a flowchart of an exemplary process for obtaining weights of a set of basis functions in approximating values of a non-linear relationship based on training data, in accordance with an exemplary embodiment of the present teaching.

FIG. 5 is a flowchart of an exemplary process of the mechanism 400 for obtaining via learning weights of a set of basis functions for encoding values of a numerical feature, in accordance with an exemplary embodiment of the present teaching. As discussed, training data archived are analyzed first at 510 to determine, at 520, a transformation function T that can be used to encode or map values of a numerical feature to a fixed range, e.g., [−1, 1]. In addition, to encode the numerical feature, a set of basis functions are determined at 530. During learning, training data are accessed and values Z of the numerical feature to be encoded are transformed, at 540, into X=T(Z) so that they are mapped to the fixed range, e.g., [−1, 1].

Each transformed value x associated with a numerical feature is then used or plugged into each of the basis functions $B_i$ to compute, at 550, the corresponding basis function values $B_i(x)$, which are then used to compute, at 560, a weighted sum of the basis function values $B_i(x)$ as the approximation of the value of the numerical feature. The computation is based on the weights associated with different basis functions stored in the weights storage 470, that are so far learned from the training data. In some embodiments, a discrepancy between the actual numerical feature value and approximated value of the non-linear numerical feature may be used to adjust, at 570, the weights as applied to the basis functions. Weights $w_i$, $1 <= i <= 5$, once learned serve, together with the basis functions, to approximate the underlying non-linear relationship being approximated.

Figure 6B:
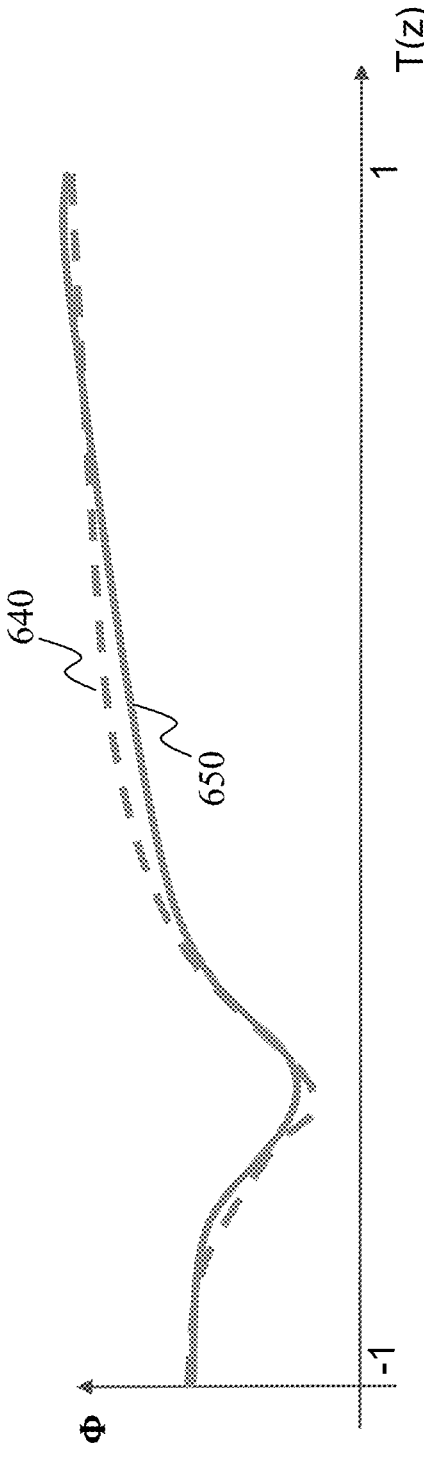
FIG. 6B provides a non-linear relationship and an approximation thereof, in accordance with an exemplary embodiment of the present teaching.

FIG. 6B shows an example numerical feature 640 with a non-linear distribution and an approximated non-linear distribution 650 achieved using the approximation approach according to the present teaching. As can be seen, the approximation 650 using spline basis functions minimizes the loss of information and avoids the issue of sparsity. Additional weights ($w_0$ and $w_i$, $6 \leq i \leq N$) in formula (1) may also be learned in the same manner based on the training data. The learning process continues by returning to step 540 to handle the next training data so that the weights may be learned in an iterative manner. With the weights learned from the training data, they can be used in factorization machine as shown in formula (1) to facilitate, assessment on, e.g., which advertisement is to be displayed to which user and/or on which platform. Given that, more accurate approximation of non-linear relationships that are considered in such factorization machine decision making enables selections that may lead to better performance.

Figure 7:
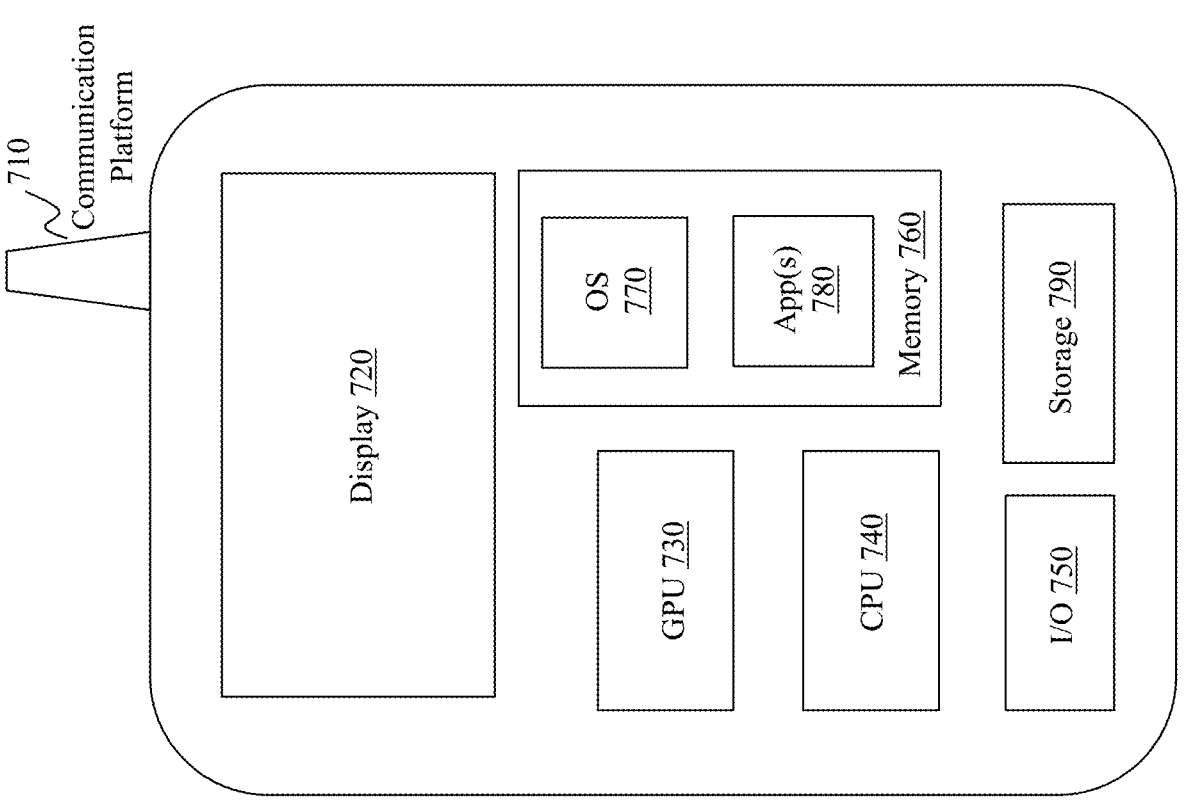
FIG. 7 is an illustrative diagram of an exemplary mobile device architecture that may be used to realize a specialized system implementing the present teaching in accordance with various embodiments.

FIG. 7 is an illustrative diagram of an exemplary mobile device architecture that may be used to realize a specialized system implementing the present teaching in accordance with various embodiments. In this example, the user device on which the present teaching may be implemented corresponds to a mobile device 700, including, but not limited to, a smart phone, a tablet, a music player, a handled gaming console, a global positioning system (GPS) receiver, and a wearable computing device, or in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 750. Any other suitable component, including but not limited to a system bus or a controller (not shown), may also be included in the mobile device 700. As shown in FIG. 7, a mobile operating system 770 (e.g., iOS, Android, Windows Phone, etc.), and one or more applications 780 may be loaded into memory 760 from storage 790 in order to be executed by the CPU 740. The applications 780 may include a user interface or any other suitable mobile apps for information analytics and management according to the present teaching on mobile device 700. User interactions, if any, may be achieved via the I/O devices 750 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 8:
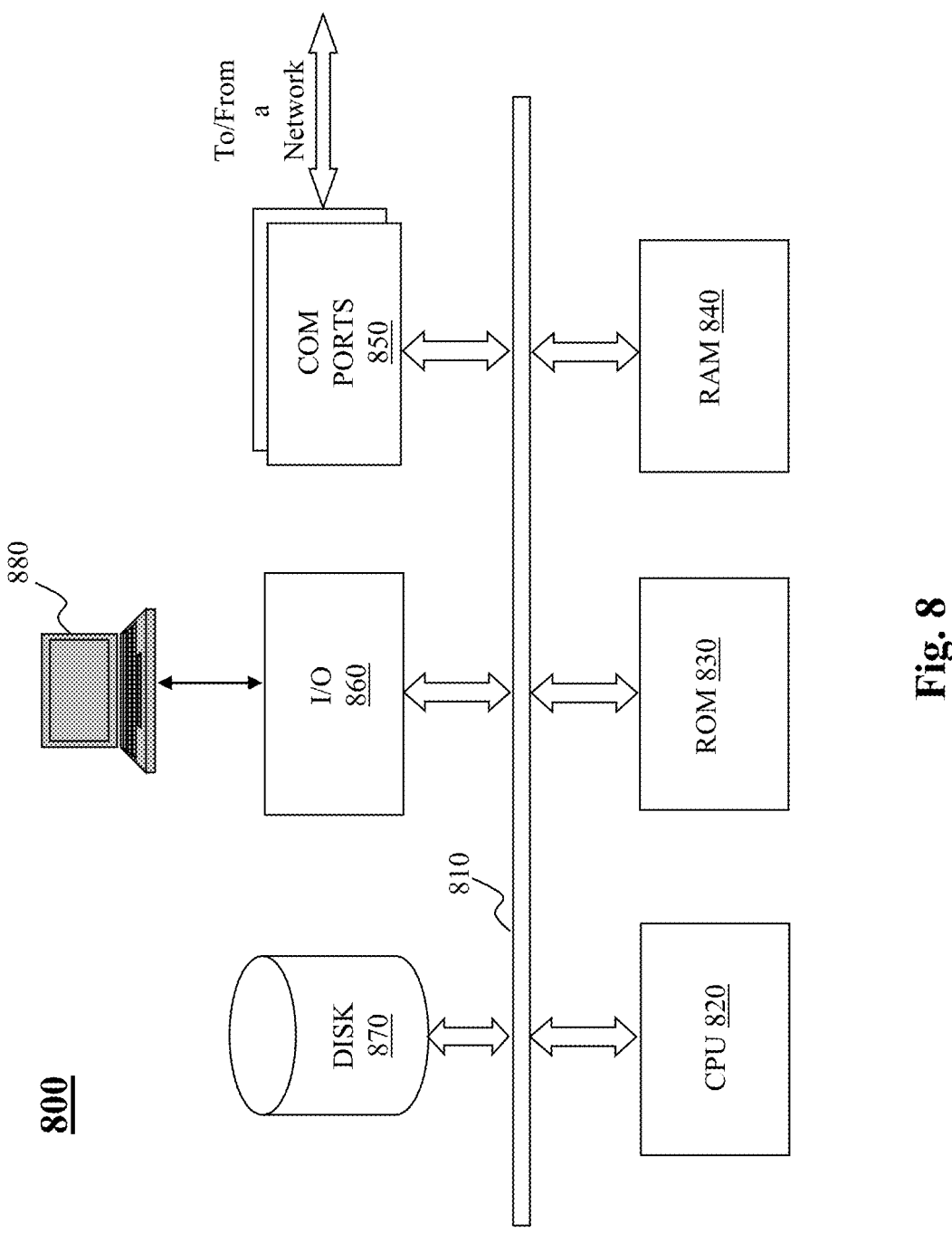
FIG. 8 is an illustrative diagram of an exemplary computing device architecture that may be used to realize a specialized system implementing the present teaching in accordance with various embodiments.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 800 may be used to implement any component or aspect of the framework as disclosed herein. For example, the information analytical and management method and system as disclosed herein may be implemented on a computer such as computer 800, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal communication bus 810, program storage and data storage of different forms (e.g., disk 870, read only memory (ROM) 830, or random-access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface elements 880. Computer 800 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on at least one processor, a memory, and a communication platform for online advertising, comprising:

obtaining, via machine learning, based on training data indicative of effectiveness of online advertisements on various websites among different users, a set of weights each of which is associated with one of a plurality of basis functions;

receiving a value of a numerical feature including a plurality of features;

transforming, via a transform function, the value into a transformed value within a fixed range;

with respect to each of the plurality of basis functions for approximating a non-linear relationship between the numerical feature and a prediction of a model associated with online advertising, computing a respective basis function value of the basis function based on the transformed value;

retrieving the set of weights;

generating an approximated value of the numerical feature to facilitate assessment on which advertisement is to be displayed to which user and on which platform, wherein the approximated value of the numeral feature depends on a sum of the plurality of basis function values weighted respectively by each corresponding one of the set of the weights, wherein the approximated value of the numerical feature also depends on interactions among the plurality of features, and wherein the approximated value of the numerical feature is used to select an online advertisement for display on an online platform; and adjusting, via machine learning and based on a discrepancy between an actual value of the numerical feature included in the training data and the approximated value of the numerical feature, the set of weights for more accurate approximation.

2. The method of claim 1, wherein the value of the numerical feature is not bounded; and the transformed value is bounded in the fixed range.

3. The method of claim 1, wherein the plurality of basis functions correspond to spline functions.

4. The method of claim 1, wherein the transform function is determined based on a cumulative distribution of the numerical feature and modeling thereof.

5. The method of claim 1, wherein the machine learning to obtain the set of weights is performed by:

initializing the set of weights, each of which is to be associated with a respective one of the plurality of basis functions;

accessing numerical feature values of the numerical feature from the training data; and with respect to each of the numerical feature values, generating an approximated numerical feature value based on a weighted sum of basis function values, each of which is weighed using a corresponding one of the set of weights and computed using a corresponding one of the plurality of basis functions based on a transformed numerical feature value associated with the numerical feature value, and adjusting the set of weights based on the numerical feature value and the approximated numerical feature value.

6. The method of claim 5, wherein the step of generating the approximated numerical feature value comprises:

transforming the numerical feature value using the transform function to generate the transformed numerical feature value;

calculating the respective basis function values of the plurality of basis functions based on the transformed numerical feature value;

applying each of the set of weights to a corresponding one of the respective basis function values to generate a weighted basis function value; and computing the approximated numerical feature value based on a sum of the weighted basis function values.

7. The method of claim 1, further comprising:

receiving values of additional features and corresponding additional weights involved in a factorization machine formulation; and computing a value of the factorization machine formulation based on the approximated value of the numerical feature, the values of the additional features, as well as the corresponding additional weights.

8. Machine readable and non-transitory medium having information recorded thereon for online advertising, wherein the information, once read by the machine, causes the machine to perform the following steps:

obtaining, via machine learning, based on training data indicative of effectiveness of online advertisements on various websites among different users, a set of weights each of which is associated with one of a plurality of basis functions;

receiving a value of a numerical feature including a plurality of features;

transforming, via a transform function, the value into a transformed value within a fixed range;

with respect to each of the plurality of basis functions for approximating a non-linear relationship between the numerical feature and a prediction of a model associated with online advertising, computing a respective basis function value of the basis function based on the transformed value;

retrieving the set of weights;

generating an approximated value of the numerical feature to facilitate assessment on which advertisement is to be displayed to which user and on which platform, wherein the approximated value of the numeral feature depends on a sum of the plurality of basis function values weighted respectively by each corresponding one of the set of the weights, wherein the approximated value of the numerical feature also depends on interactions among the plurality of features, and wherein the approximated value of the numerical feature is used to select an online advertisement for display on an online platform; and adjusting, via machine learning and based on a discrepancy between an actual value of the numerical feature included in the training data and the approximated value of the numerical feature, the set of weights for more accurate approximation.

9. The medium of claim 8, wherein the value of the numerical feature is not bounded; and the transformed value is bounded in the fixed range.

10. The medium of claim 8, wherein the plurality of basis functions correspond to spline functions.

11. The medium of claim 8, wherein the transform function is determined based on a cumulative distribution of the numerical feature and modeling thereof.

12. The medium of claim 8, wherein the machine learning to obtain the set of weights is carried out by:

initializing the set of weights, each of which is to be associated with a respective one of the plurality of basis functions;

accessing numerical feature values of the numerical feature from the training data;

with respect to each of the numerical feature values, generating an approximated numerical feature value based on a weighted sum of basis function values, each of which is weighed using a corresponding one of the set of weights and computed using a corresponding one of the plurality of basis functions based on a transformed numerical feature value associated with the numerical feature value, adjusting the set of weights based on the numerical feature value and the approximated numerical feature value.

13. The medium of claim 12, wherein the step of generating the approximated numerical feature value comprises:

transforming the numerical feature value using the transform function to generate the transformed numerical feature value;

calculating the respective basis function values of the plurality of basis functions based on the transformed numerical feature value;

applying each of the set of weights to a corresponding one of the respective basis function values to generate a weighted basis function value;

computing the approximated numerical feature value based on a sum of the weighted basis function values.

14. The medium of claim 8, wherein the information, once read by the machine, further causes the machine to perform the step of:

receiving values of additional features and corresponding additional weights involved in a factorization machine formulation;

computing a value of the factorization machine formulation based on the approximated value of the numerical feature, the values of the additional features, as well as the corresponding additional weights.

15. A system for online advertising, comprising:

a machine learning mechanism configured for obtaining, via machine learning, based on training data indicative of effectiveness of online advertisements on various websites among different users, a set of weights each of which is associated with one of a plurality of basis functions;

a training data processor configured for receiving a value of a numerical feature including a plurality of features;

a data transformation unit configured for transforming, via a transform function, the value into a transformed value within a fixed range;

a basis function value generator configured for computing, with respect to each of the plurality of basis functions for approximating a non-linear relationship between the numerical feature and a prediction of a model associated with online advertising, a respective basis function value of the basis function based on the transformed value, wherein the set of weights are used for generating an approximated value of the numerical feature to facilitate assessment on which advertisement is to be displayed to which user and on which platform, wherein the approximated value of the numeral feature depends on a sum of the plurality of basis function values weighted respectively by each corresponding one of the set of the weights, wherein the approximated value of the numerical feature also depends on interactions among the plurality of features, and wherein the approximated value of the numerical feature is used to select an online advertisement for display on an online platform, and the set of weights is adjusted for more accurate approximation via machine learning and based on a discrepancy between an actual value of the numerical feature included in the training data and the approximated value of the numerical feature.

16. The system of claim 15, wherein the value of the numerical feature is not bounded; and the transformed value is bounded in the fixed range.

17. The system of claim 16, wherein the transformed function is determined based on a cumulative distribution of the numerical feature and modeling thereof.

18. The system of claim 15, wherein the plurality of basis functions correspond to spline functions.

19. The system of claim 15, wherein the machine learning to obtain the set of weights is performed by:

initializing the set of weights, each of which is to be associated with a respective one of the plurality of basis functions;

accessing numerical feature values of the numerical feature from the training data;

with respect to each of the numerical feature values, generating an approximated numerical feature value based on a weighted sum of basis function values, each of which is weighed using a corresponding one of the set of weights and computed using a corresponding one of the plurality of basis functions based on a transformed numerical feature value associated
with the numerical feature value,
adjusting the set of weights based on the numerical
feature value and the approximated numerical fea-
ture value. 5
20. The system of claim 19, wherein the step of generating
the approximated numerical feature value comprises:
transforming the numerical feature value using the trans-
form function to generate the transformed numerical
feature value; 10
calculating the respective basis function values of the
plurality of basis functions based on the transformed
numerical feature value;
applying each of the set of weights to a corresponding one
of the respective basis function values to generate a 15
weighted basis function value;
computing the approximated numerical feature value
based on a sum of the weighted basis function values.

* * * * *